United States Patent
Li

(10) Patent No.: US 12,553,633 B2
(45) Date of Patent: Feb. 17, 2026

(54) ELECTRICAL APPARATUS SETTING METHOD AND ELECTRONIC DEVICE

(71) Applicant: Wistron Corporation, New Taipei (TW)

(72) Inventor: Chun-Hsien Li, New Taipei (TW)

(73) Assignee: Wistron Corporation, New Taipei (TW)

( * ) Notice: Subject to any disclaimer, the term of this patent is extended or adjusted under 35 U.S.C. 154(b) by 371 days.

(21) Appl. No.: 18/327,042

(22) Filed: May 31, 2023

(65) Prior Publication Data

US 2024/0369246 A1    Nov. 7, 2024

(30) Foreign Application Priority Data

May 5, 2023   (TW) .................................. 112116865

(51) Int. Cl.
 *F24F 11/46*    (2018.01)
 *F24F 11/64*    (2018.01)

(52) U.S. Cl.
 CPC .............. *F24F 11/46* (2018.01); *F24F 11/64* (2018.01)

(58) Field of Classification Search
 CPC .. F24F 11/30; F24F 11/46; F24F 11/63; F24F 11/64; F04B 49/06; G06F 18/27; G06N 20/00
 See application file for complete search history.

(56) References Cited

U.S. PATENT DOCUMENTS

| | | | | |
|---|---|---|---|---|
| 11,781,772 B2 * | 10/2023 | Coakley | ................... | F24F 11/84 |
| | | | | 700/276 |
| 2019/0024928 A1 * | 1/2019 | Li | ....................... | G05B 13/0265 |
| 2019/0354071 A1 * | 11/2019 | Turney | ................... | G06N 3/045 |
| 2020/0309399 A1 * | 10/2020 | Coakley | ................... | H04W 4/33 |

FOREIGN PATENT DOCUMENTS

CN           116045461        5/2023

* cited by examiner

*Primary Examiner* — J. Campbell
(74) *Attorney, Agent, or Firm* — JCIPRNET

(57) ABSTRACT

An electrical apparatus setting method and an electronic device are provided. The method includes the following steps. Apparatus operation information of multiple electrical apparatuses is obtained. An apparatus power consumption prediction model of each electrical apparatus is established according to the apparatus operation information of the electrical apparatuses. Multiple input feature variables of the apparatus power consumption prediction model of each electrical apparatus include an adjustable setting parameter of each electrical apparatus. The adjustable setting parameter is set as multiple setting values, and the apparatus power consumption prediction model of each electrical apparatus is used to obtain multiple apparatus energy efficiencies respectively corresponding to the setting values. A decision parameter value of the adjustable setting parameter is determined by comparing the apparatus energy efficiencies of each electrical apparatus. The electrical apparatuses are controlled according to the decision parameter value.

16 Claims, 10 Drawing Sheets

ELECTRICAL APPARATUS SETTING METHOD AND ELECTRONIC DEVICE

CROSS-REFERENCE TO RELATED APPLICATION

This application claims the priority benefit of Taiwan application serial no. 112116865, filed on May 5, 2023. The entirety of the above-mentioned patent application is hereby incorporated by reference herein and made a part of this specification.

BACKGROUND

Technical Field

The disclosure relates to an energy-saving method, and in particular relates to an electrical apparatus setting method and an electronic device.

Description of Related Art

As the environmental campaigns of greenhouse gas reduction, energy conservation, and carbon reduction become more and more important, energy conservation has become one of the key development projects today. If reasons for power waste can be found and appropriate energy-saving manners can be effectively offered, it will not only contribute to environmental protection, but also greatly benefit the cost and profit of factories.

Electrical apparatuses all require power to operate. Electrical apparatuses with low energy efficiencies need to consume more power to achieve operational targets or may even fail to operate normally, thereby causing power to be wasted. Generally, there are multiple electrical apparatuses in a factory, but not all the electrical apparatuses need to be turned on during a production process. Since energy efficiencies and apparatus states of the electrical apparatuses are all different, which electrical apparatus an apparatus manager chooses to use directly affects the power cost and the production efficiency. It is known that the setting of an apparatus parameter of the electrical apparatus also directly affects the power cost and the production efficiency. At present, professional apparatus personnel are required to rely on long-term accumulated personal subjective experience to try to achieve the objective of energy conservation by adjusting the apparatus parameter of the electrical apparatus. However, it is often not easy for the apparatus personnel to know how to set the apparatus parameters of multiple electrical apparatuses in a workplace to meet manufacturing requirements while saving power as much as possible.

SUMMARY

In view of this, the disclosure provides an electrical apparatus setting method and an electronic device, which can solve the above technical issues.

An embodiment of the disclosure provides an electrical apparatus setting method, which includes the following steps. Apparatus operation information of multiple electrical apparatuses is obtained. An apparatus power consumption prediction model of each electrical apparatus is established according to the apparatus operation information of the electrical apparatuses. Multiple input feature variables of the apparatus power consumption prediction model of each electrical apparatus include an adjustable setting parameter of each electrical apparatus. The adjustable setting parameter is set as multiple setting values, and the apparatus power consumption prediction model of each electrical apparatus is used to obtain multiple apparatus energy efficiencies respectively corresponding to the setting values. A decision parameter value of the adjustable setting parameter is determined by comparing the apparatus energy efficiencies of each electrical apparatus. The electrical apparatuses are controlled according to the decision parameter value.

An embodiment of the disclosure provides an electronic device, which includes a storage device and a processor. The storage device stores multiple commands. The processor is coupled to the storage device, accesses commands, and is configured to execute the following operations. Apparatus operation information of multiple electrical apparatuses is obtained. An apparatus power consumption prediction model of each electrical apparatus is established according to the apparatus operation information of the electrical apparatuses. Multiple input feature variables of the apparatus power consumption prediction model of each electrical apparatus include an adjustable setting parameter of each electrical apparatus. The adjustable setting parameter is set as multiple setting values, and the apparatus power consumption prediction model of each electrical apparatus is used to obtain multiple apparatus energy efficiencies respectively corresponding to the setting values. A decision parameter value of the adjustable setting parameter is determined by comparing the apparatus energy efficiencies of each electrical apparatus. The electrical apparatuses are controlled according to the decision parameter value.

Based on the above, in the embodiments of the disclosure, the apparatus power consumption prediction model of each electrical apparatus may be established according to the apparatus operation information of each electrical apparatus and may be used to predict a predicted power consumption of each electrical apparatus. The apparatus energy efficiencies respectively corresponding to the setting values may be obtained by inputting the adjustable setting parameter set as the setting values into the power consumption prediction model. The decision parameter value of the adjustable setting parameter may be determined by comparing the apparatus energy efficiencies of each electrical apparatus. Therefore, controlling the electrical apparatuses according to the decision parameter value of the adjustable setting parameter can achieve the targets of effectively saving power and improving energy usage efficiency.

DESCRIPTION OF THE EMBODIMENTS

Figure 1:
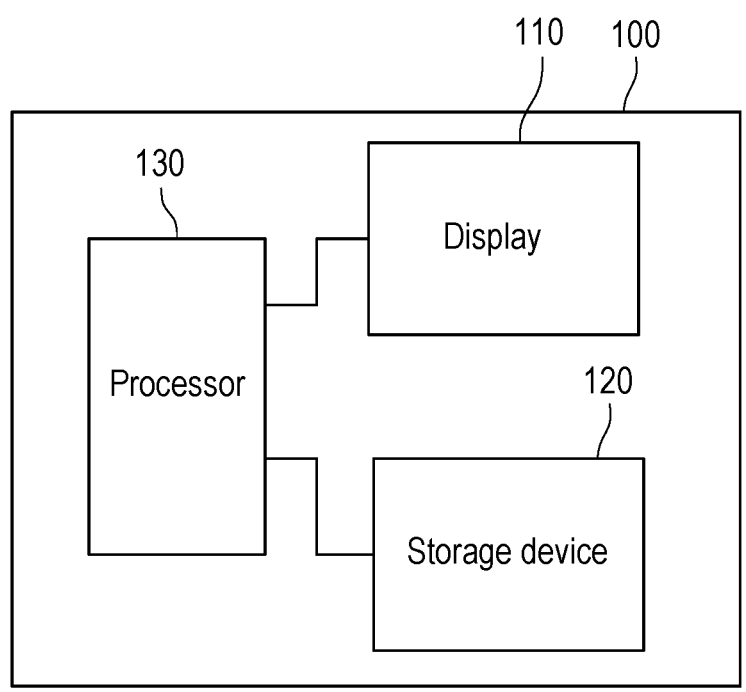
FIG. 1 is a schematic diagram of an electronic device according to an embodiment of the disclosure.

Some embodiments of the disclosure will be described in detail with reference to the drawings. For the reference numerals cited in the following description, when the same reference numerals appear in different drawings, the reference numerals will be regarded as referring to the same or similar elements. The embodiments are only a part of the disclosure and do not disclose all possible implementations of the disclosure. More specifically, the embodiments are merely examples of a device and a method within the claims of the disclosure.

Please refer to FIG. 1, which is a schematic diagram of an electronic device according to an embodiment of the disclosure. In different embodiments, an electronic device 100 is, for example, a notebook computer, a desktop computer, a server, a workstation, and other computer devices with computing abilities, but not limited thereto. The electronic device 100 may include a display 110, a storage device 120, and a processor 130.

The display 110 is, for example, various types of displays such as a liquid crystal display (LCD), a light emitting diode (LED) display, and an organic light emitting diode (OLED) built in the electronic device 100, but not limited thereto. In other embodiments, the display 110 may also be any display device externally connected to the electronic device 100.

The storage device 120 is, for example, any type of fixed or removable random access memory (RAM), read-only memory (ROM), flash memory, hard disc drive, other similar devices, or a combination of the devices to be used to record multiple commands, program codes, or software modules.

The processor 130 is, for example, a central processing unit (CPU), an application processor (AP), other programmable general-purpose or specific-purpose microprocessors, digital signal processors (DSP), graphics processing units (GPU), other similar devices, an integrated circuit, or a combination thereof. The processor 130 may access and execute the software modules recorded in the storage device 120 to implement an electrical apparatus setting method in the embodiment of the disclosure. The software modules may be broadly interpreted to mean commands, command sets, codes, program codes, programs, applications, software packages, threads, procedures, functions, etc., regardless of whether the same are referred to as software, firmware, intermediate software, microcode, hardware description language, or others.

Figure 2:
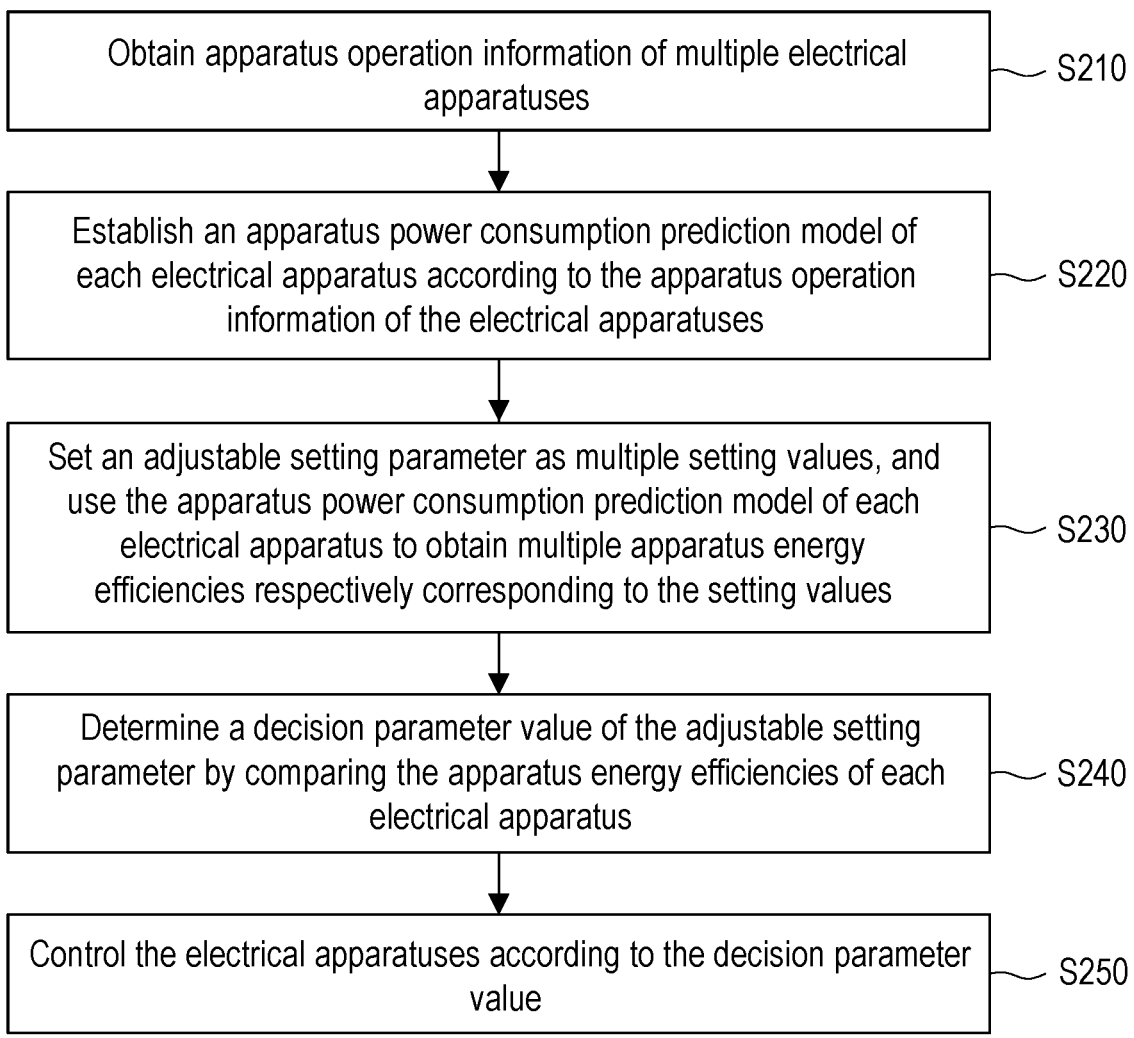
FIG. 2 is a flowchart of an electrical apparatus setting method according to an embodiment of the disclosure.

FIG. 2 is a flowchart of an electrical apparatus setting method according to an embodiment of the disclosure. Please refer to FIG. 1 and FIG. 2. The method of the embodiment is applicable to the electronic device 100 in the foregoing embodiment. The detailed steps of the electrical apparatus setting method of the embodiment will be described below in conjunction with various elements in the electronic device 100.

In Step S210, the processor 130 obtains apparatus operation information of multiple electrical apparatuses. Herein, the electrical apparatuses are apparatuses with the same function disposed within a certain field, but specifications and models of the electrical apparatuses may be the same or different. The field is, for example, a factory, a store, a department store, an indoor gymnasium, etc. The electrical apparatuses may be multiple air conditioners. Alternatively, the electrical apparatuses may be multiple air compressors. The apparatus operation information of the electrical apparatuses may include power consumption data, apparatus state data, apparatus output data, etc. The apparatus operation information of the electrical apparatuses may be obtained through sensing by sensors of the electrical apparatuses or measuring instruments. The sensors or the measuring instruments may include electric meters, thermometers, pressure gauges, etc., and the disclosure is not limited thereto.

From another point of view, the electronic device 100 may be directly or indirectly connected to the electrical apparatuses or the measuring instruments, so as to receive the apparatus operation information provided by the electrical apparatuses. Alternatively, the electronic device 100 may receive the apparatus operation information input by an operator through an input device (for example, a keyboard, a mouse, etc.). Alternatively, the electronic device 100 may receive the apparatus operation information of the electrical apparatuses from other control apparatuses or data servers.

In some embodiments, the electrical apparatuses include multiple air conditioners. The apparatus operation information of the air conditioners may include power consumption per unit period, refrigerating volume per unit time, condenser pressure per unit time, chilled water return temperature per unit time, chilled water supply temperature per unit time, etc.

In some embodiments, the electrical apparatuses include multiple air compressors. The apparatus operation information of the air compressors may include power consumption per unit period, exhaust pressure per unit period, exhaust volume per unit time, exhaust pressure temperature per unit time, etc.

In Step S220, the processor 130 establishes an apparatus power consumption prediction model of each electrical apparatus according to the apparatus operation information of the electrical apparatuses. Specifically, the processor 130 may establish the apparatus power consumption prediction model of each electrical apparatus according to the apparatus operation information of each electrical apparatus, and model parameters of the apparatus power consumption prediction model trained based on a machine learning algorithm may be recorded in the storage device 120. In other words, the processor 130 may use the apparatus operation information of a past period of time (also referred to as historical apparatus operation information) as training data set to perform machine learning, so as to predict a predicted power consumption of each electrical apparatus in a unit period according to input feature variables.

In some embodiments, the apparatus power consumption prediction model of each electrical apparatus may be a linear regression model. The processor 130 may use a training data set to estimate a weight of each feature variable in the linear regression model by the least square method to be used as a training product for training the power consumption prediction model. In this way, the processor 130 may use multiple weights and input feature variables of the linear regression model to estimate the power consumption per unit time. It should be particularly noted that the input feature variables of the apparatus power consumption prediction model of each electrical apparatus include an adjustable setting parameter of each electrical apparatus. For example, the adjustable setting parameter of each air conditioner may be a chilled water return temperature or a frozen water supply temperature. Alternatively, the adjustable setting parameter of each air compressor may be an exhaust pressure. In other words, the adjustable setting parameter and other input feature variables of each electrical apparatus are input into the corresponding apparatus power consumption prediction model, so that the apparatus power consumption prediction model may correspondingly output the predicted power consumption of each electrical apparatus. Herein, the adjustable setting parameter of each electrical apparatus is an apparatus parameter that may be automatically adjusted by an apparatus personnel or the electronic device 100.

In some embodiments, the processor 130 may correspondingly adjust the adjustable setting parameter of each electrical apparatus according to an environmental parameter. For example, the environmental parameter may be an ambient temperature, and the adjustable setting parameter may be the chilled water return temperature. The processor 130 may look up a table according to the ambient temperature to adjust the corresponding chilled water return temperature. Alternatively, the processor 130 may input the ambient temperature into a preset function to adjust the corresponding chilled water return temperature. Alternatively, the processor 130 may adjust the chilled water return temperature according to a temperature difference between the ambient temperature and a preset reference temperature.

Figure 3:
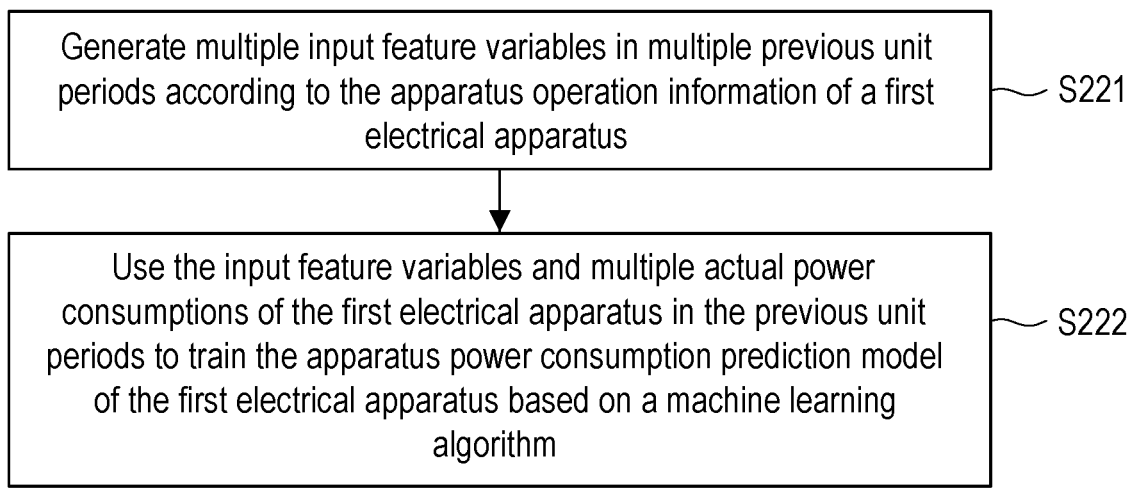
FIG. 3 is a flowchart of establishing an apparatus power consumption prediction model according to an embodiment of the disclosure.

Please refer to FIG. 3, which is a flowchart of establishing an apparatus power consumption prediction model according to an embodiment of the disclosure. In some embodiments, Step S220 may be implemented as Step S221 and Step S222. It should be noted that the establishment manners of the apparatus power consumption prediction models of the electrical apparatuses are similar, and a first electrical apparatus among the electrical apparatuses will be described below.

In Step S221, the processor 130 may generate multiple input feature variables in multiple previous unit periods according to the apparatus operation information of the first electrical apparatus. Specifically, the processor 130 may obtain the input feature variables corresponding to the previous unit periods and associated with the first electrical apparatus according to the apparatus operation information of the first electrical apparatus in the previous unit periods. The time length of the previous unit period may be a week, a day, half a day, an hour, etc., which is not limited in the disclosure. In other words, the input feature variables in the previous unit periods are model training data generated according to the actual operation of the electrical apparatus. For example, the processor 130 may generate the refrigerating volume per unit time of the first electrical apparatus in the previous unit period according to a temperature difference between the frozen water supply temperature and a frozen water return temperature within a certain previous unit period (for example, the previous hour). The processor 130 may generate the refrigerating volume per unit time of the first electrical apparatus within the previous unit periods (for example, the previous three hours, the previous two hours, or the previous one hour) according to the same operation manner. In the embodiment, the input feature variables include refrigerating volumes of the first electrical apparatus within the previous unit periods.

In some embodiments, the first electrical apparatus is an air conditioner. The input feature variables of the first electrical apparatus in the previous unit periods may include the refrigerating volume per unit time, the condenser pressure per unit time, the chilled water return temperature per unit time, the chilled water supply temperature per unit time, etc.

In some embodiments, the first electrical apparatus is an air compressor. The input feature variables of the first electrical apparatus in the previous unit periods may include the exhaust volume per unit time, exhaust pressure per unit time, exhaust temperature per unit time, etc.

In Step S222, the processor 130 uses the input feature variables and multiple actual power consumptions of the first electrical apparatus in the previous unit periods to train the apparatus power consumption prediction model of the first electrical apparatus based on the machine learning algorithm. Specifically, during the model training process, a ground truth for training the apparatus power consumption prediction model is the actual power consumption of the previous unit period. For example, the processor 130 inputs the input feature variable of a certain previous unit period (for example, 17:00 to 18:00 on April 25) into the model being trained, and uses the actual power consumption of the first electrical apparatus in the same previous unit period (that is, 17:00 to 18:00 on April 25) as the ground truth required for model training.

The machine learning algorithm for training the apparatus power consumption prediction model may include, but not limited to, a random forest algorithm, a linear regression algorithm, or a support vector machine (SVM) algorithm. However, the disclosure does not limit the machine learning algorithm for training the apparatus power consumption prediction model, which may be set according to actual applications.

For example, assuming that the machine learning algorithm for training the apparatus power consumption prediction model is the linear regression algorithm, the processor 130 may obtain multiple coefficients and a constant term of the linear regression model to establish the apparatus power consumption prediction model. In other words, the processor 130 may obtain the influence degree of each input feature variable on the power consumption of the first electrical apparatus. For example, the processor 130 may obtain the model parameters (that is, the coefficients corresponding to the input feature variables in the linear regression model) shown in Table 1 and the constant term "295" of the linear regression model.

TABLE 1

| Input feature variable | Refrigerating volume per unit time | Condenser pressure per unit time | Chilled water return temperature per unit time | Chilled water supply temperature per unit time |
|---|---|---|---|---|
| Influence degree (coefficient) | 0.015 | 0.15 | −0.27 | −0.02 |

Afterwards, in Step S230, the processor 130 sets the adjustable setting parameter as multiple setting values, and uses the apparatus power consumption prediction model of each electrical apparatus to obtain multiple apparatus energy efficiencies respectively corresponding to the setting values. The apparatus energy efficiencies of each electrical apparatus may represent the apparatus operational efficiency that may be achieved per unit of power consumption under the condition that the adjustable setting parameter is respectively set as the setting values.

In detail, after establishing the apparatus power consumption prediction model of each electrical apparatus, the processor 130 may respectively input the adjustable setting parameter set as the setting values into the apparatus power consumption prediction model to perform multiple power consumption predictions, so as to obtain the predicted power consumptions respectively corresponding to the setting values. Afterwards, the processor 130 may calculate the apparatus energy efficiencies corresponding to each setting value according to the predicted power consumptions respectively corresponding to the setting values and multiple output statistics corresponding to the setting values. Specifically, the processor 130 may obtain the apparatus energy efficiency corresponding to a certain setting value according to a ratio of the output statistic corresponding to the setting value to the predicted power consumption corresponding to the setting value.

Figure 4:
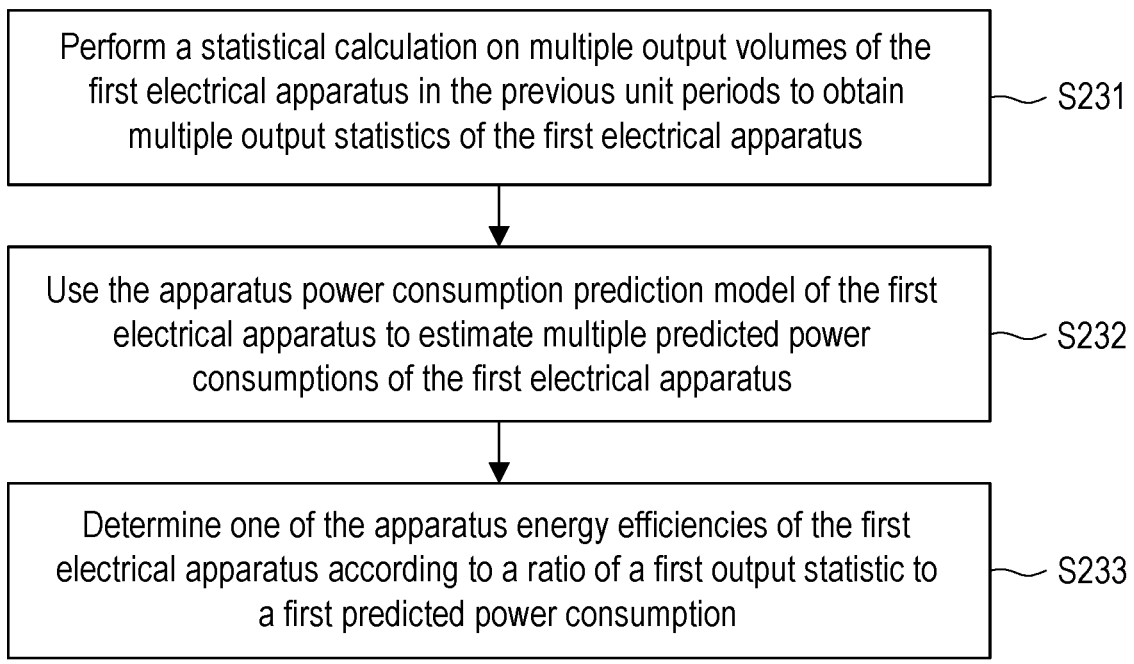
FIG. 4 is a flowchart of obtaining an apparatus energy efficiency according to an embodiment of the disclosure.

Please refer to FIG. 4, which is a flowchart of obtaining an apparatus energy efficiency according to an embodiment of the disclosure. In some embodiments, Step S230 may be implemented as Step S231 to Step S233. It should be noted that manners for generating the apparatus energy efficiencies of the electrical apparatuses are similar, and the first electrical apparatus among the electrical apparatuses will be described below.

In Step S231, the processor 130 performs a statistical calculation on multiple output volumes of the first electrical apparatus in the previous unit periods to obtain the output statistics of the first electrical apparatus. Here, the output statistics respectively correspond to the setting values and include a first output statistic. The first output statistic corresponds to a first setting value among the setting values.

In some embodiments, if the electrical apparatuses are multiple air conditioners, the output volumes include multiple refrigerating volumes (that is, refrigerating volume per unit period). Alternatively, in some embodiments, if the electrical apparatuses are multiple air compressors, the output volumes include multiple exhaust volumes (that is, exhaust volume per unit period).

In some embodiments, the processor 130 may obtain multiple first output volumes corresponding to the first setting value according to the first setting value. Under the condition that the adjustable setting parameter is set as the first setting value, the processor 130 may obtain the first output volumes corresponding to the first setting value from the historical apparatus operation information of the first electrical apparatus. For example, the processor 130 may extract the first output volumes corresponding to the first setting value according to the historical apparatus operation information of the first electrical apparatus within recent months, wherein the first output volumes are output volume per unit time. Next, the processor 130 may perform a statistical calculation on the first output volumes to obtain the first output statistic of the first electrical apparatus. The statistical calculation is, for example, a mean calculation or a mode calculation. In other words, the processor 130 may calculate the mean value or the mode of the first output volumes to obtain the first output statistic corresponding to the first setting value.

In some embodiments, taking the adjustable setting parameter as the chilled water return temperature as an example, the chilled water return temperature may be respectively set as multiple temperature setting values, such as 20 degrees, 22 degrees, and 25 degrees. In the case where the chilled water return temperature is set as 25 degrees, the processor 130 may extract multiple refrigerating volumes per unit time corresponding to 25 degrees from the historical apparatus operation information, which are refrigerating volumes when the chilled water return temperature within the previous unit period is set as 25 degrees.

For example, in the case where the chilled water return temperature is set as 25 degrees, the processor 130 may obtain multiple refrigerating volumes and multiple condenser pressures shown in Table 2 from the historical apparatus operation information of the first electrical apparatus. In the example in Table 2, the processor 130 may, for example, obtain 100 refrigerating volumes and 100 condenser pressures that meet the chilled water return temperature set as 25 degrees. Taking Table 2 as an example, the chilled water return temperature of the air conditioner (that is, the first electrical apparatus) is set as 25 degrees from 9:00 to 10:00 on Day B of Month A in the past (that is, a certain previous unit period), and the refrigerating volume per unit period and the condenser pressure of the air conditioner are respectively "3600" and "5" from 9:00 to 10:00 on Day B of Month A.

TABLE 2

| Number | Refrigerating volume per unit period | Condenser pressure |
|---|---|---|
| 1 | 3600 | 5 |
| 2 | 3540 | 6 |
| . . . | . . . | . . . |
| 100 | 3550 | 4 |

Then, the processor 130 may perform the mean calculation on the 100 refrigerating volumes per unit period to obtain a first mean value (that is, the first output statistic), such as "2106", and perform the mean calculation on the 100 condenser pressures to obtain a second mean value, such as "5".

In some embodiments, taking the adjustable setting parameter as the exhaust pressure as an example, the exhaust pressure may be respectively set as multiple pressure setting values, such as 6 bar, 7 bar, and 8 bar. In the case where the exhaust pressure is set as 6 bar, the processor 130 may extract multiple exhaust volumes per unit time corresponding to 6 bar from the historical apparatus operation information, which are the exhaust volumes when the exhaust pressure is set as 6 bar within the previous unit period.

In Step S232, the processor 130 uses the apparatus power consumption prediction model of the first electrical apparatus to estimate the predicted power consumptions of the first electrical apparatus. Here, the predicted power consumptions respectively correspond to the setting values and include a first predicted power consumption. The first predicted power consumption corresponds to the first setting value among the setting values. In some embodiments, the processor 130 inputs the first output statistic and the adjustable setting parameter set as the first setting value into the apparatus power consumption prediction model to obtain the first predicted power consumption corresponding to the first setting value.

Using the examples of Table 1 and Table 2 to continue to illustrate, in the case where the chilled water return temperature is set as 25 degrees (that is, the first setting value), the processor 130 may input the first mean value "2106" of the 100 refrigerating volumes per unit period, the second mean value "5" of the 100 condenser pressures, and the chilled water return temperature set as 25 degrees into the linear regression model shown in Table 1, thereby obtaining the first predicted power consumption corresponding to 25 degrees. More specifically, based on the examples of Table 1 and Table 2, the processor 130 may, for example, estimate that the first predicted power consumption of the first electrical apparatus is 295+0.015*2106+0.15*5−0.27*25−0.02*30=320 kWh. The chilled water supply temperature "30 degrees" is determined according to the chilled water return temperature.

Similarly, the processor 130 may obtain the predicted power consumptions and the output statistics corresponding to other temperature setting values (for example, 20 degrees, 22 degrees, 27 degrees, etc.) according to the same manner. For example, for the first electrical apparatus, the processor 130 may generate the output statistics and the predicted power consumptions corresponding to the temperature setting values as shown in Table 3 below.

TABLE 3

| Chilled water return temperature | Refrigerating volume | Predicted power consumption |
|---|---|---|
| 20 | 2107 | 312 |
| 22 | 2107 | 327 |
| 25 | 2106 | 320 |
| 27 | 2108 | 324 |
| 28 | 2108 | 330 |
| 30 | 2109 | 350 |
| 32 | 2108 | 374 |

According to the example of Table 3, it can be known that as the chilled water return temperature increases, the predicted power consumption of the air conditioner also increases accordingly. In addition, in some embodiments, when the electrical apparatus is an air compressor and the adjustable setting parameter is the exhaust pressure, the processor 130 may generate the exhaust volumes and the predicted power consumptions corresponding to the pressure setting values.

Afterwards, in Step S233, the processor 130 determines one of the apparatus energy efficiencies of the first electrical apparatus according to a ratio of the first output statistic to the first predicted power consumption. By dividing the first output statistic by the first predicted power consumption, the processor 130 may obtain one of the apparatus energy efficiencies of the first electrical apparatus. For example, the processor 130 may divide the first output statistic "2106" by the first predicted power consumption "320" to calculate that the apparatus energy efficiency corresponding to 25 degrees is "6.58". In addition, in some embodiments, when the electrical apparatus is an air compressor and the adjustable setting parameter is the exhaust pressure, the processor 130 may respectively divide a mean value of the exhaust volumes by the corresponding predicted power consumptions to obtain the apparatus energy efficiencies.

Please return to FIG. 2 again. According to the execution of Step S230, the processor 130 may generate the apparatus energy efficiencies corresponding to different setting values of each electrical apparatus. For example, in the case where the chilled water return temperature is set as the setting values, the processor 130 may obtain the predicted power consumptions and the apparatus energy efficiencies corresponding to different setting values of the first electrical apparatus and a second electrical apparatus, which are as shown in Table 4 below. The first electrical apparatus is, for example, an air conditioner including a fixed-frequency ice water host, and the second electrical apparatus is, for example, an air conditioner including a variable-frequency ice water host.

TABLE 4

| Chilled water return temperature | Predicted power consumption of first electrical apparatus (degree) | Apparatus energy efficiency of first electrical apparatus | Predicted power consumption of second electrical apparatus (degree) | Apparatus energy efficiency of second electrical apparatus |
|---|---|---|---|---|
| 27 | 324 | 6.51 | 320 | 6.59 |
| 28 | 330 | 6.39 | 325 | 6.49 |
| 29 | 336 | 6.27 | 331 | 6.37 |
| 30 | 350 | 6.02 | 355 | 5.94 |
| 31 | 361 | 5.84 | 371 | 5.68 |
| 32 | 374 | 5.64 | 383 | 5.50 |

Afterwards, in Step S240, the processor 130 determines a decision parameter value of the adjustable setting parameter by comparing the apparatus energy efficiencies of each electrical apparatus. In detail, the processor 130 may generate multiple function line segments of the electrical apparatuses according to the apparatus energy efficiencies of each electrical apparatus. According to an intersection point of the function line segments, the processor 130 may obtain one or more decision parameter values of the adjustable setting parameter. The unit of the decision parameter value is the same as the unit of the adjustable setting parameter. For example, assuming that the adjustable setting parameter is the chilled water return temperature, the decision parameter value is also a temperature value. Assuming that the adjustable setting parameter is the exhaust pressure, the decision parameter value is also a pressure value.

Figure 5:
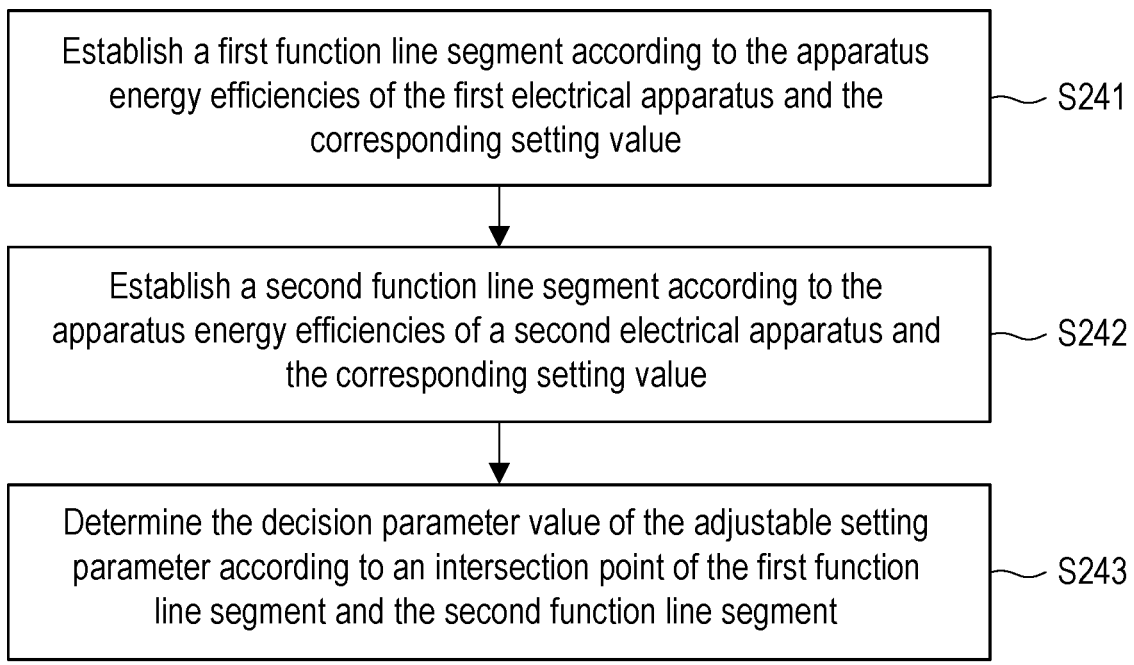
FIG. 5 is a flowchart of determining a decision parameter value according to an embodiment of the disclosure.

Please refer to FIG. 5, which is a flowchart of determining a decision parameter value according to an embodiment of the disclosure. In some embodiments, Step S240 may be implemented as Step S241 to Step S243. It should be noted that the following will take the first electrical apparatus and the second electrical apparatus as examples for illustration, but the disclosure does not limit the number of electrical apparatuses. For the convenience of description, please refer to FIG. 5 together with FIG. 6, which is a schematic diagram of determining a decision parameter value according to an embodiment of the disclosure.

Figure 6:
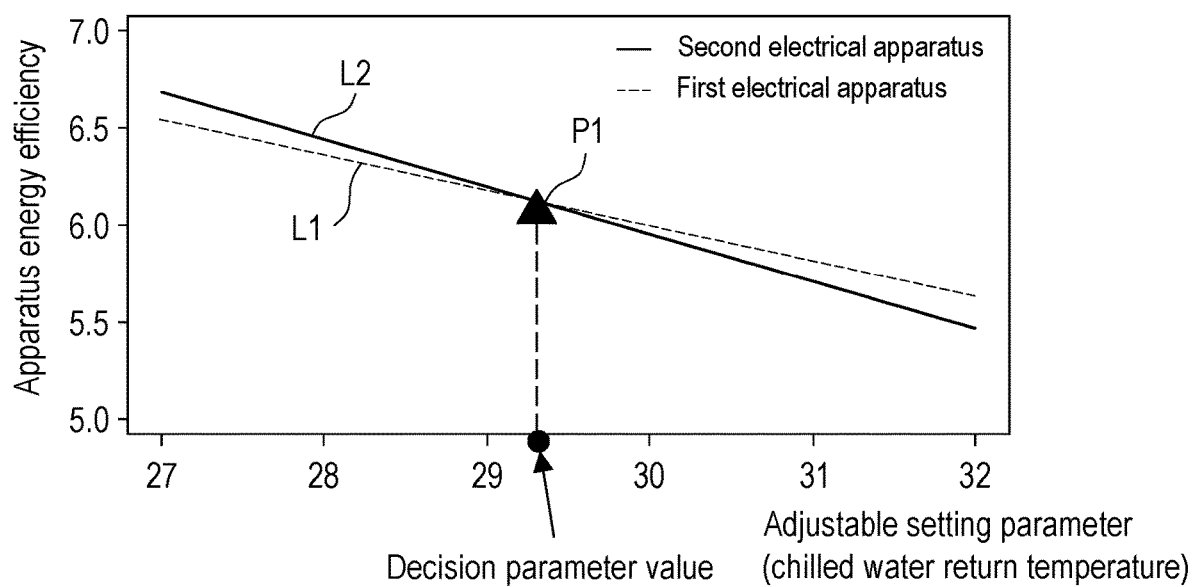
FIG. 6 is a schematic diagram of determining a decision parameter value according to an embodiment of the disclosure.

In Step S241, the processor 130 may establish a first function line segment L1 according to the apparatus energy efficiencies of the first electrical apparatus and the corresponding setting value. In Step S242, the processor 130 may establish a second function line segment L2 according to the apparatus energy efficiencies of the second electrical apparatus and the corresponding setting value. For example, FIG. 6 is an example of the data of Table 4. Under the condition that the chilled water return temperature is 27 degrees to 32 degrees, the processor 130 may generate the first function line segment L1 according to the apparatus energy efficiencies of the first electrical apparatus, and generate the second function line segment L2 according to the apparatus energy efficiencies of the second electrical apparatus.

In Step S243, the processor 130 may determine the decision parameter value of the adjustable setting parameter according to an intersection point P1 of the first function line segment L1 and the second function line segment L2. In the example of FIG. 6, the decision parameter value corresponding to the intersection point P1 of the first function line segment L1 and the second function line segment L2 may, for example, be 29.2 degrees. Referring to FIG. 6, it can be known that when the chilled water return temperature is less than the decision parameter value "29.2 degrees", the second electrical apparatus is preferably turned on. Conversely, when the chilled water return temperature is greater than the decision parameter value "29.2 degrees", the first electrical apparatus is preferably turned on. It can be known that the decision parameter value "29.2 degrees" corresponding to the chilled water return temperature may be used as a decision reference value for determining whether to turn on the first electrical apparatus or the second electrical apparatus.

In Step S250, the processor 130 controls the electrical apparatuses according to the decision parameter value. Specifically, after the apparatus personnel determines a target setting value of the adjustable setting parameter according to environmental factors or other various factors, the processor 130 may compare the target setting value with the decision parameter value to determine to use a certain electrical apparatus and stop other electrical apparatuses. In other words, after confirming the target setting value of the adjustable setting parameter, the processor 130 may know which electrical apparatus may have a higher apparatus energy efficiency under the condition that the adjustable setting parameter is set as the target setting value. In addition, the processor 130 may also perform productivity evaluation on the implemented apparatus setting manner according to the decision parameter value.

Figure 7:
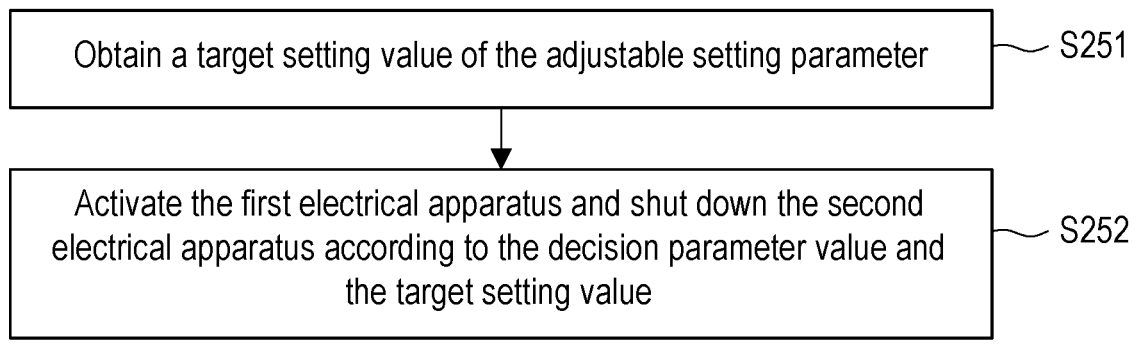
FIG. 7 is a flowchart of controlling multiple electrical apparatuses according to an embodiment of the disclosure.

Please refer to FIG. 7, which is a flowchart of controlling multiple electrical apparatuses according to an embodiment of the disclosure. In some embodiments, Step S250 may be implemented as Step S251 and Step S252. It should be noted that the following will take the first electrical apparatus and the second electrical apparatus as examples for illustration, but the disclosure does not limit the number of electrical apparatuses.

In Step S251, the processor 130 obtains the target setting value of the adjustable setting parameter. It should be noted that for the electrical apparatuses, adjustable ranges of the adjustable setting parameters may be the same or different. Assuming that the adjustable setting parameter is the chilled water return temperature or the frozen water supply temperature of the air conditioner, the adjustable range of the adjustable setting parameter may also be affected by the ambient temperature. For example, within a single time, the chilled water return temperature must not be less than 20 degrees nor higher than 32 degrees. If the adjustable range is exceeded, the hot and cold exchange efficiency of a water host will be negatively affected. Therefore, 20 degrees and 32 degrees may be used as limit thresholds for setting the target setting value, that is, the apparatus personnel may set the target setting value between 20 degrees and 32 degrees.

In Step S252, the processor 130 activates the first electrical apparatus and shuts down the second electrical apparatus according to the decision parameter value and the target setting value. Specifically, after determining the target setting value, the processor 130 may judge whether the target setting value is greater than the decision parameter value. As shown in the example of FIG. 6, in response to the target setting value being greater than the decision parameter value "29.2 degrees", the processor 130 may activate the first electrical apparatus and shut down the second electrical apparatus. Conversely, in response to the target setting value being less than the decision parameter value "29.2 degrees", the processor 130 may shut down the first electrical apparatus and activate the second electrical apparatus. In other words, when the target setting value is greater than the decision parameter value, the first electrical apparatus may be activated and the adjustable setting parameter thereof is set as the target setting value, and at the same time, the second electrical apparatus may be shut down. In this way, by selecting the first electrical apparatus with a preferable apparatus energy efficiency for operation, the objectives of energy conservation and improving energy usage efficiency can be achieved.

In some embodiments, the processor 130 may use a transceiver based on wired or wireless transmission standards to send control signals to the electrical apparatuses to activate or shut down the electrical apparatuses. The electrical apparatuses are shut down or turned on in response to the control signals. In addition, in some embodiments, the processor 130 may determine the usage sequence of the electrical apparatuses according to the decision parameter value and the target setting value.

Figure 8:
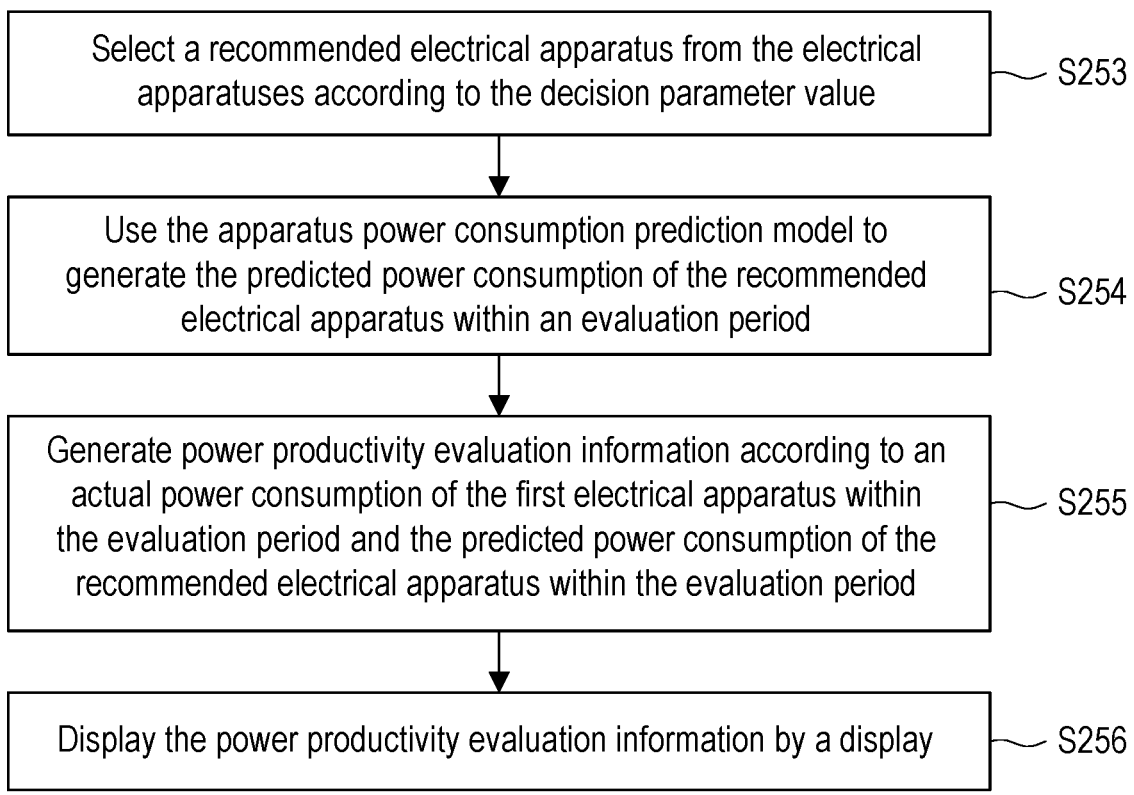
FIG. 8 is a flowchart of generating power productivity evaluation information according to an embodiment of the disclosure.

Please refer to FIG. 8, which is a flowchart of generating power productivity evaluation information according to an embodiment of the disclosure. In some embodiments, Step S250 may be implemented as Step S253 to Step S256.

In some embodiments, the processor 130 obtains the actual apparatus setting manner in the previous unit periods, and checks the apparatus setting manner in the previous unit periods to generate the power productivity evaluation information.

In Step S253, the processor 130 selects a recommended electrical apparatus from the electrical apparatuses for an evaluation period according to the decision parameter value. The evaluation period may include one or more previous unit periods. In detail, in the case where an actual setting value applied to the adjustable setting parameter in each previous unit period is confirmed, the processor 130 may compare the actual setting value actually applied in the evaluation period with the decision parameter value, and determine the recommended electrical apparatus for the evaluation period. Taking the decision parameter value "29.2 degrees" determined in FIG. 6 as an example, actual operation data of the first electrical apparatus within the evaluation period may be shown in Table 5, and the recommended electrical apparatus corresponding to each evaluation period may be shown in Table 6.

TABLE 5

| Evaluation period | Electrical apparatus actually turned on | Refrigerating volume per unit period | Chilled water return temperature | Actual power consumption | Actual apparatus energy efficiency |
|---|---|---|---|---|---|
| 14:00 | 1# | 2090 | 29.5 | 345 | 6.06 |
| 15:00 | 1# | 2095 | 29.0 | 348 | 6.02 |
| 16:00 | 1# | 2105 | 29.0 | 346 | 6.08 |
| 17:00 | 1# | 2086 | 28.5 | 343 | 6.08 |

TABLE 6

| Evaluation period | Chilled water return temperature | Recommended electrical apparatus | Apparatus energy efficiency of recommended electrical apparatus |
|---|---|---|---|
| 14:00 | 29.5 | 1# | 6.06 |
| 15:00 | 29.0 | 2# | 6.37 |
| 16:00 | 29.0 | 2# | 6.37 |
| 17:00 | 28.5 | 2# | 6.42 |

Referring to Table 5, it can be known that the first electrical apparatus is actually turned on during 4 evaluation periods to reduce the ambient temperature. However, since the target setting values applied to the evaluation periods "15:00 to 16:00", "16:00 to 17:00", and "17:00 to 18:00" are respectively "29.0", "29.0", and "28.5", in the case where the decision parameter value is "29.2 degrees", the recommended electrical apparatus corresponding to the evaluation periods "15:00 to 16:00", "16:00 to 17:00", and "17:00 to 18:00" is the second electrical apparatus.

In Step S254, the processor 130 uses the apparatus power consumption prediction model to generate the predicted power consumption of the recommended electrical apparatus within the evaluation period. The processor 130 may obtain the predicted power consumption within the evaluation period by using the apparatus power consumption prediction model of the recommended electrical apparatus. For example, according to the example of Table 6, the processor 130 may obtain the predicted power consumptions of the recommended electrical apparatus (that is, the second electrical apparatus) within the evaluation periods, which are shown in Table 7. It should be noted that the processor 130 may estimate the predicted power consumptions of the recommended electrical apparatus within the evaluation periods according to the actual setting value corresponding to the adjustable setting parameter and historical operation information of the recommended electrical apparatus.

In Step S256, the processor 130 displays the power productivity evaluation information by the display 110. In other words, the processor 130 may provide the power productivity evaluation information by the display 110, so that an apparatus manager may adjust the setting manner of the electrical apparatus according to the power productivity evaluation information, so as to reduce energy waste. For example, the display 110 may display the power productivity evaluation information on an operation interface for reference by the apparatus personnel.

Figure 9:
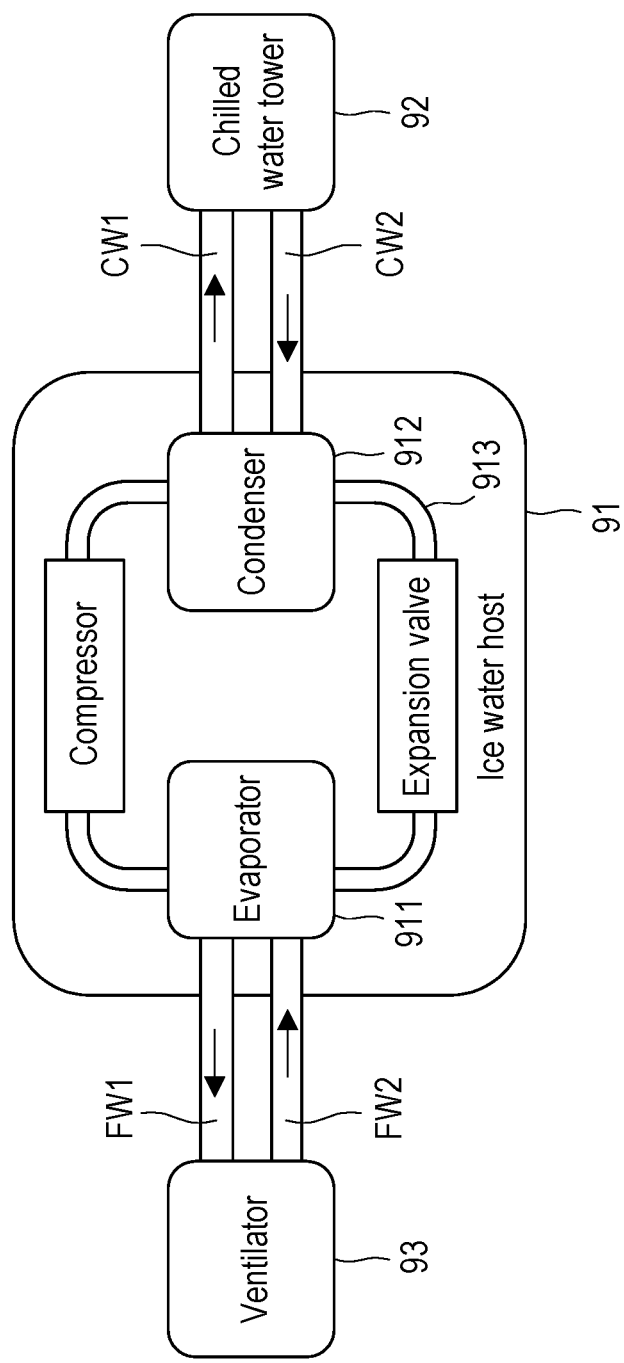
FIG. 9 is a schematic diagram of an air conditioner according to an embodiment of the disclosure.

FIG. 9 is a schematic diagram of an air conditioner according to an embodiment of the disclosure. Please refer to FIG. 9. The air conditioner may include an ice water host 91, a ventilator 93, and a chilled water tower 92. The ice water host 91 may include an evaporator 911, a condenser 912, and a refrigerant pipeline 913. The evaporator 911 supplies frozen water FW1 to the ventilator 93, and receives frozen water FW2 from the ventilator 93. The evaporator 911 may cool down the frozen water FW2 into the frozen water FW1 by a refrigerant. A frozen water supply temperature of the frozen water FW1 may be an adjustable setting

TABLE 7

| Evaluation period | Electrical apparatus actually turned on | Refrigerating volume per unit period | Actual power consumption | Recommended electrical apparatus | Apparatus energy efficiency of recommended electrical apparatus | Predicted power consumption of recommended electrical apparatus |
| --- | --- | --- | --- | --- | --- | --- |
| 15:00 | 1# | 2095 | 348 | 2# | 6.37 | 329 |
| 16:00 | 1# | 2105 | 346 | 2# | 6.37 | 330 |
| 17:00 | 1# | 2086 | 343 | 2# | 6.42 | 325 |

In Step S255, the processor 130 generates the power productivity evaluation information according to the actual power consumption of the first electrical apparatus within the evaluation period and the predicted power consumption of the recommended electrical apparatus within the evaluation period. For example, the processor 130 may obtain the power productivity evaluation information shown in Table 7 or Table 8.

TABLE 8

| Evaluation period | Electrical apparatus turned on | Chilled water return temperature | Predicted power consumption of recommended electrical apparatus | Actual power consumption |
| --- | --- | --- | --- | --- |
| 15:00 | 1# | 29.0 | 329 | 348 |
| 16:00 | 1# | 29.0 | 330 | 346 |
| 17:00 | 1# | 28.5 | 325 | 343 |

In addition, in some embodiments, the processor 130 may also calculate a power consumption disparity and a cost saving benefit in the power productivity evaluation information according to the actual power consumption of the first electrical apparatus within the evaluation period and the predicted power consumption of the recommended electrical apparatus within the evaluation period. Taking Table 8 as an example, the power consumption disparity may be (348-329)+(346-330)+(343-325)=53 degrees. For a single unit time period, about 2% of power consumption may be saved. In some embodiments, the processor 130 may also calculate the cost saving benefit according to the power consumption disparity and a unit electricity charge. The cost saving benefit may, for example, be the cost saving amount.

parameter of the air conditioner. The condenser 912 supplies chilled water CW1 to the chilled water tower 92, and receives chilled water CW2 from the chilled water tower 92. The condenser 912 may use the chilled water CW2 from the chilled water tower 92 to cool down the refrigerant to generate the chilled water CW1 with a higher temperature. A chilled water return temperature of the chilled water CW2 may be an adjustable setting parameter of the air conditioner.

In addition, in some embodiments, the refrigerating volume of the air conditioner may be generated according to Formula (1) below. Formula (1): refrigerating volume=temperature difference of frozen water*flow rate*specific heat of water. The temperature difference of the frozen water is a temperature difference between the frozen water FW1 and the frozen water FW2.

Figure 10:
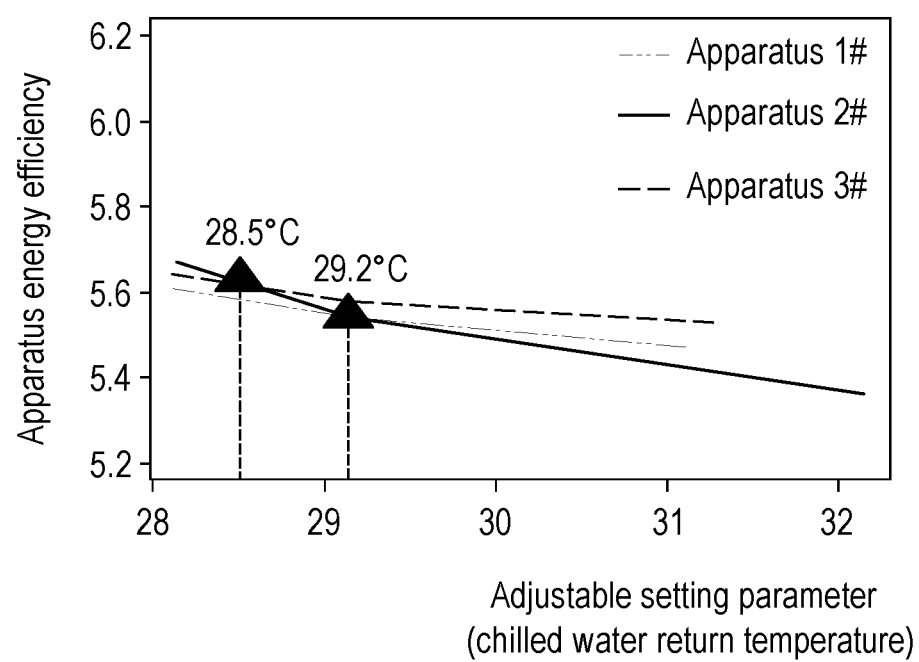
FIG. 10 is a schematic diagram of determining a decision parameter value according to an embodiment of the disclosure.

FIG. 10 is a schematic diagram of determining a decision parameter value according to an embodiment of the disclosure. Please refer to FIG. 10. In the embodiment, the processor 130 may determine two decision parameter values, which are respectively "29.2 degrees" and "28.5 degrees", according to function line segments of three electrical apparatuses. Therefore, the processor 130 may determine to turn on one of the three electrical apparatuses according to the two decision parameter values and the target setting value of the adjustable setting parameter, and may generate the power productivity evaluation information according to the two decision parameter values. In the example of FIG. 10, after determining the target setting value according to the ambient temperature, if the processor 130 judges that the target setting value is less than "28.5 degrees", the processor 130 turns on "Apparatus 2 #". If the processor 130 judges that the target setting value is greater than "28.5 degrees" and less than "29.2 degrees", the processor 130 turns on "Apparatus 3 #". If the processor 130 judges that the target setting value is greater than "29.2 degrees", the processor 130 turns on "Apparatus 3 #". In other words, in response to changes in the ambient temperature, when the target setting value changes from less than "28.5 degrees" to greater than "29.2 degrees", the processor 130 may switch from turning on "Apparatus 2 #" to turning on "Apparatus 3 #".

The processing procedure of the electrical apparatus setting method executed by at least one processor is not limited to the above implementations. For example, a part of the steps (processing) may be omitted, and the steps may be executed in another sequence. Also, any two or more of the steps may be combined, and a part of the steps may be modified or deleted. Alternatively, other steps may be executed in addition to the steps.

In summary, in the embodiments of the disclosure, the apparatus power consumption prediction model may be established according to the apparatus operation information of the electrical apparatuses. In the case where the adjustable setting parameter is respectively set as the setting values, the apparatus power consumption prediction model of each electrical apparatus may be used to generate the apparatus energy efficiency corresponding to each setting value. The apparatus energy efficiencies of the electrical apparatuses may be used to determine the decision parameter value associated with the adjustable setting parameter, and the decision parameter value may determine the setting manner of the electrical apparatuses. Since the embodiments of the disclosure can recommend to use the electrical apparatus with a higher apparatus energy efficiency according to the decision parameter value, power can be effectively saved and energy usage rate can be improved under the condition of meeting production environment requirements.

What is claimed is:

1. An electrical apparatus setting method, comprising:
obtaining apparatus operation information of a plurality of electrical apparatuses;
establishing an apparatus power consumption prediction model of each of the electrical apparatuses according to the apparatus operation information of the electrical apparatuses, wherein a plurality of input feature variables of the apparatus power consumption prediction model of each of the electrical apparatuses comprise an adjustable setting parameter of each of the electrical apparatuses;
setting the adjustable setting parameter as a plurality of setting values, and using the apparatus power consumption prediction model of each of the electrical apparatuses to obtain a plurality of apparatus energy efficiencies respectively corresponding to the setting values;
determining a decision parameter value of the adjustable setting parameter by comparing the apparatus energy efficiencies of each of the electrical apparatuses; and
controlling, by a processor, the electrical apparatuses according to the decision parameter value through using a transceiver based on a wired transmission standard or a wireless transmission standard to send control signals to the electrical apparatuses,
wherein the electrical apparatuses comprise a first electrical apparatus and a second electrical apparatus, and the step of controlling the electrical apparatuses according to the decision parameter value comprises:
obtaining a target setting value of the adjustable setting parameter; and
activating the first electrical apparatus and shutting down the second electrical apparatus by comparing to the decision parameter value and the target setting value, wherein the adjustable setting parameter of the first electrical apparatus is set as the target setting value,
wherein the step of establishing the apparatus power consumption prediction model of each of the electrical apparatuses according to the apparatus operation information of the electrical apparatuses comprises:
generating the input feature variables in a plurality of previous unit periods according to the apparatus operation information of each of the first electrical apparatus and the second electrical apparatus; and
using the input feature variables and a plurality of actual power consumptions of the first electrical apparatus in the plurality of previous unit periods to train the apparatus power consumption prediction model of each of the first electrical apparatus and the second electrical apparatus based on a machine learning algorithm.

2. The electrical apparatus setting method according to claim 1, wherein the step of setting the adjustable setting parameter as the setting values, and using the apparatus power consumption prediction model of each of the electrical apparatuses to obtain the apparatus energy efficiencies respectively corresponding to the setting values comprises:
performing a statistical calculation on a plurality of output volumes of the first electrical apparatus in the plurality of previous unit periods to obtain a plurality of output statistics of the first electrical apparatus, wherein the output statistics respectively correspond to the setting values and comprise a first output statistic;
using the apparatus power consumption prediction model of the first electrical apparatus to estimate a plurality of predicted power consumptions of the first electrical apparatus, wherein the predicted power consumptions respectively correspond to the settings value and comprise a first predicted power consumption; and
determining one of the apparatus energy efficiencies of the first electrical apparatus according to a ratio of the first output statistic to the first predicted power consumption, wherein the first output statistic and the first predicted power consumption correspond to a first setting value among the setting values.

3. The electrical apparatus setting method according to claim 2, wherein the step of performing the statistical calculation on the output volumes of the first electrical apparatus in the plurality of previous unit periods to obtain the output statistics of the first electrical apparatus comprises:
obtaining a plurality of first output volumes corresponding to the first setting value according to the first setting value; and
performing a statistical calculation on the first output volumes to obtain the first output statistic of the first electrical apparatus.

4. The electrical apparatus setting method according to claim 2, wherein the step of using the apparatus power consumption prediction model of the first electrical apparatus to estimate the predicted power consumptions of the first electrical apparatus comprises:
inputting the first output statistic and the adjustable setting parameter set as the first setting value into the apparatus power consumption prediction model to obtain the first predicted power consumption corresponding to the first setting value.

5. The electrical apparatus setting method according to claim 2, wherein the electrical apparatuses comprise a plurality of air conditioners, and the output volumes comprise a plurality of refrigerating volumes.

6. The electrical apparatus setting method according to claim 2, wherein the electrical apparatuses comprise a plurality of air compressors, and the output volumes comprise a plurality of exhaust volumes.

7. The electrical apparatus setting method according to claim 1, wherein the step of determining the decision parameter value of the adjustable setting parameter by comparing the apparatus energy efficiencies of each of the electrical apparatuses comprises:
establishing a first function line segment according to the apparatus energy efficiencies of the first electrical apparatus and the corresponding setting value;
establishing a second function line segment according to the apparatus energy efficiencies of the second electrical apparatus and the corresponding setting value; and
determining the decision parameter value of the adjustable setting parameter according to an intersection point of the first function line segment and the second function line segment when the first function line segment and the second function line segment intersect.

8. The electrical apparatus setting method according to claim 1, wherein the step of controlling the electrical apparatuses according to the decision parameter value comprises:
selecting a recommended electrical apparatus from the electrical apparatuses for an evaluation period according to the decision parameter value;
using the apparatus power consumption prediction model to generate a predicted power consumption of the recommended electrical apparatus within the evaluation period; and
generating power productivity evaluation information according to an actual power consumption of the first electrical apparatus within the evaluation period and the predicted power consumption of the recommended electrical apparatus within the evaluation period.

9. An electronic device, comprising:
a storage device, storing a plurality of commands;
a processor, coupled to the storage device and accessing the commands to execute:
obtaining apparatus operation information of a plurality of electrical apparatuses;
establishing an apparatus power consumption prediction model of each of the electrical apparatuses according to the apparatus operation information of the electrical apparatuses, wherein a plurality of input feature variables of the apparatus power consumption prediction model of each of the electrical apparatuses comprise an adjustable setting parameter of each of the electrical apparatuses;
setting the adjustable setting parameter as a plurality of setting values, and using the apparatus power consumption prediction model of each of the electrical apparatuses to obtain a plurality of apparatus energy efficiencies respectively corresponding to the setting values;
determining a decision parameter value of the adjustable setting parameter by comparing the apparatus energy efficiencies of each of the electrical apparatuses; and
controlling the electrical apparatuses according to the decision parameter value through using a transceiver based on a wired transmission standard or a wireless transmission standard to send control signals to the electrical apparatuses,
wherein the electrical apparatuses comprise a first electrical apparatus and a second electrical apparatus, and the processor further executes:
obtaining a target setting value of the adjustable setting parameter; and
activating the first electrical apparatus and shutting down the second electrical apparatus by comparing to the decision parameter value and the target setting value, wherein the adjustable setting parameter of the first electrical apparatus is set as the target setting value,
wherein the processor further executes:
generating the input feature variables in a plurality of previous unit periods according to the apparatus operation information of each of the first electrical apparatus and the second electrical apparatus; and
using the input feature variables and a plurality of actual power consumptions of the first electrical apparatus in the plurality of previous unit periods to train the apparatus power consumption prediction model of each of the first electrical apparatus and the second electrical apparatus based on a machine learning algorithm.

10. The electronic device according to claim 9, wherein the processor further executes:
performing a statistical calculation on a plurality of output volumes of the first electrical apparatus in the plurality of previous unit periods to obtain a plurality of output statistics of the first electrical apparatus, wherein the output statistics respectively correspond to the setting values and comprise a first output statistic;
using the apparatus power consumption prediction model of the first electrical apparatus to estimate a plurality of predicted power consumptions of the first electrical apparatus, wherein the predicted power consumptions respectively correspond to the settings value and comprise a first predicted power consumption; and
determining one of the apparatus energy efficiencies of the first electrical apparatus according to a ratio of the first output statistic to the first predicted power consumption, wherein the first output statistic and the first predicted power consumption correspond to a first setting value among the setting values.

11. The electronic device according to claim 10, wherein the processor further executes:
obtaining a plurality of first output volumes corresponding to the first setting value according to the first setting value; and
performing a statistical calculation on the first output volumes to obtain the first output statistic of the first electrical apparatus.

12. The electronic device according to claim 10, wherein the processor further executes:
inputting the first output statistic and the adjustable setting parameter set as the first setting value into the apparatus power consumption prediction model to obtain the first predicted power consumption corresponding to the first setting value.

13. The electronic device according to claim 10, wherein the electrical apparatuses comprise a plurality of air conditioners, and the output volumes comprise a plurality of refrigerating volumes.

14. The electronic device according to claim 10, wherein the electrical apparatuses comprise a plurality of air compressors, and the output volumes comprise a plurality of exhaust volumes.

15. The electronic device according to claim 9, wherein the processor further executes:
establishing a first function line segment according to the apparatus energy efficiencies of the first electrical apparatus and the corresponding setting value;
establishing a second function line segment according to the apparatus energy efficiencies of the second electrical apparatus and the corresponding setting value; and determining the decision parameter value of the adjustable setting parameter according to an intersection point of the first function line segment and the second function line segment when the first function line segment and the second function line segment intersect.

16. The electronic device according to claim 9, wherein the processor further executes:
- selecting a recommended electrical apparatus from the electrical apparatuses for an evaluation period according to the decision parameter value;
- using the apparatus power consumption prediction model to generate a predicted power consumption of the recommended electrical apparatus within the evaluation period; and
- generating power productivity evaluation information according to an actual power consumption of the first electrical apparatus within the evaluation period and the predicted power consumption of the recommended electrical apparatus within the evaluation period.

* * * * *